United States Patent
Oh et al.

(10) Patent No.: US 8,536,992 B2
(45) Date of Patent: Sep. 17, 2013

(54) APPARATUS AND METHOD OF REPRODUCING CONTENT IN MOBILE TERMINAL

(75) Inventors: Yoon Hark Oh, Gyeonggi-do (KR); Hyong Uk Choi, Seoul (KR); Joon Ho Won, Gyeonggi-do (KR); Jong Sung Joo, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 766 days.

(21) Appl. No.: 12/637,979

(22) Filed: Dec. 15, 2009

(65) Prior Publication Data

US 2010/0148942 A1 Jun. 17, 2010

(30) Foreign Application Priority Data

Dec. 17, 2008 (KR) ........................ 10-2008-0128238

(51) Int. Cl.
*G08B 3/10* (2006.01)

(52) U.S. Cl.
USPC ............... 340/384.7; 340/407.1; 340/384.1; 84/645; 369/4; 381/57; 700/94

(58) Field of Classification Search
USPC ........... 340/407.1, 384.1, 384.7, 4.4; 84/609, 84/645; 369/4; 381/57; 700/94; 310/331
See application file for complete search history.

(56) References Cited

U.S. PATENT DOCUMENTS

| 8,115,091 | B2* | 2/2012 | Brenner et al. | 84/645 |
| 2003/0070538 | A1* | 4/2003 | Sugiyama et al. | 84/645 |
| 2003/0114150 | A1* | 6/2003 | Hayashi | 455/418 |
| 2010/0004028 | A1* | 1/2010 | Park et al. | 455/566 |
| 2010/0127601 | A1* | 5/2010 | Pettersson | 310/331 |

* cited by examiner

*Primary Examiner* — Brent Swarthout
(74) *Attorney, Agent, or Firm* — Cha & Reiter, LLC

(57) ABSTRACT

Content reproducing apparatus and method of a mobile terminal are disclosed. During the reproduction of content, vibration pattern corresponding to content is detect or generated. The vibration pattern is synchronized with an audio signal during the reproduction of content.

20 Claims, 6 Drawing Sheets

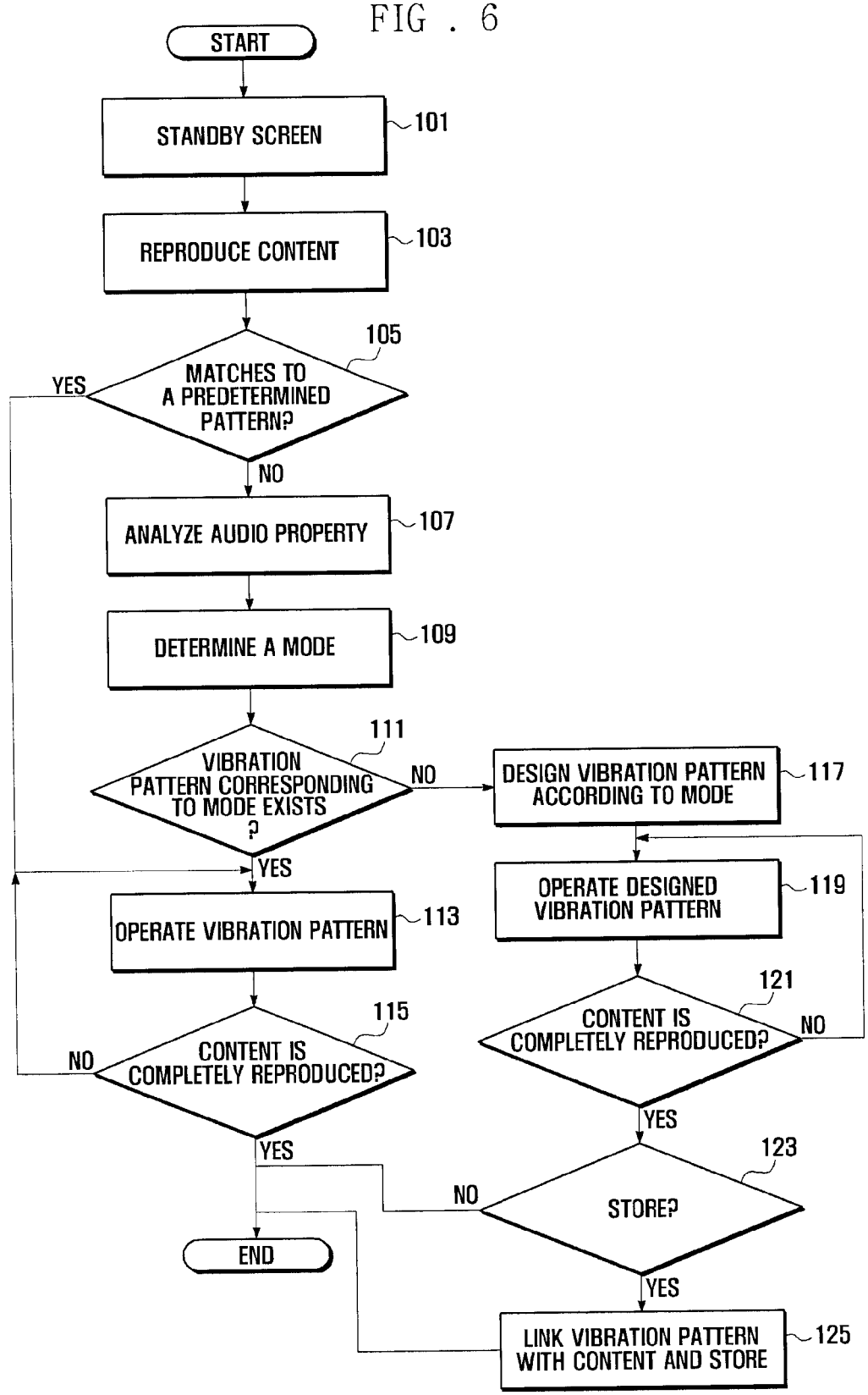

APPARATUS AND METHOD OF REPRODUCING CONTENT IN MOBILE TERMINAL

CLAIMS OF PRIORITY

This application claims priority to an application entitled "APPARATUS AND METHOD OF REPRODUCING CONTENT IN MOBILE TERMINAL" filed in the Korean Intellectual Property Office on Dec. 17, 2008 and assigned Serial No. 10-2008-0128238, the contents of which are incorporated herein by reference.

BACKGROUND OF THE INVENTION

1. Field of the Invention

The present invention relates generally to a mobile terminal and, more particularly, to apparatus and method of outputting vibration patterns of a mobile terminal to enhance hearing of sound.

2. Description of the Related Art

Mobile terminals are widely used and in some countries, a majority of population relies on mobile communication over land lines. The mobile communication terminals equipped with various functions, including g an MP3 player for reproducing files, an image collecting feature that is equivalent of a digital camera, and games.

The file reproducing function involves reproduction of files including audio and music files stored in a memory. However, the existing mobile terminal cannot guarantee an adequate sound quality because of a limit in its size, manufacturing costs, and other spatial restriction.

SUMMARY OF THE INVENTION

The present invention has been made in view of the above problem, and the present invention provides a mobile terminal and its method for enabling a user to enjoy various contents in a high level of quality.

In accordance with the aspects of the present invention, there is provided a content reproducing apparatus of a mobile terminal including: a storage unit storing content including audio data; an input unit generating an input signal for reproducing the stored content; a control unit checking whether a vibration pattern linked with the content is stored and synchronizing the vibration pattern during the reproduction of the content; and a vibration operator providing vibrations according to the vibration pattern.

The present invention also provides a method of reproducing content in a mobile terminal including: commanding a reproduction of the content including audio data; checking whether a vibration pattern linked with the content exists; and synchronizing the reproduction of the content with the vibration pattern when the vibration pattern exists.

The present invention also provides a method of reproducing content in a mobile terminal including: commanding a reproduction of the content including audio data; analyzing an audio property including at least one of amplitude and frequency associated with some part of the audio data to detect an audio pattern; determining a mode describing at least one of a musical genre and timbre that correspond to the audio pattern; designing a vibration pattern based on the determined mode; and realizing vibrations based on the vibration pattern.

According to the multi-function executing method according to the aspect of the present invention, the content reproducing apparatus of a mobile terminal, and the content reproducing method thereof, users may listen and enjoy more sensitive, realistic and better quality audio during the reproduction mode.

BRIEF DESCRIPTION OF THE DRAWINGS

The above features and advantages of the present invention will be more apparent from the following detailed description in conjunction with the accompanying drawings, in which:

FIG. 6 is a flowchart illustrating a method of reproducing content in a mobile terminal according to an exemplary embodiment of the present invention.

DETAILED DESCRIPTION OF THE INVENTION

Hereinafter, exemplary embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

Figure 1:
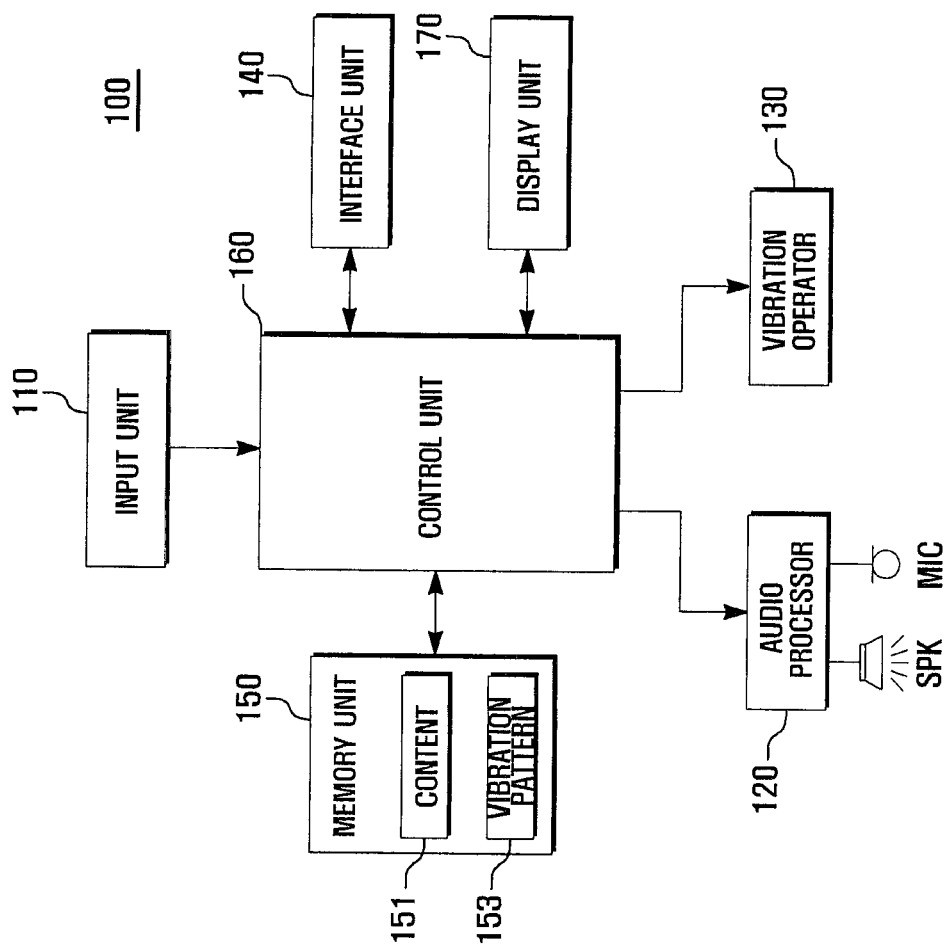
FIG. 1 is a schematic block diagram illustrating a mobile terminal according to an exemplary embodiment of the present invention.

FIG. 1 is a schematic block diagram illustrating a mobile terminal according to an exemplary embodiment of the present invention.

Referring to FIG. 1, a mobile terminal 100 includes an input unit 110, an audio processor 120, a vibration operator 130, an interface unit 140, a memory unit 150, a display unit 170, and a control unit 170.

In operation, the mobile terminal 100 analyzes audio property included in a content to be reproduced among contents stored in the memory unit 150 and designs vibration pattern 153 according to the analyzed audio property. The mobile terminal 100 outputs an audio signal through the audio processor 120 during the reproduction of content and controls the vibration operator 130 according to the designed vibration pattern 153 to generate vibrations on the mobile terminal. By doing so, the mobile terminal 100 reinforces the reproduced audio signal with the vibration pattern 153 so that the mobile terminal user can enjoy more realistic, dynamic, and enhance audio sound. Hereinafter, configuration of the mobile terminal 100 will be described in detail.

The input unit 110 includes a plurality of input keys and function keys for inputting alphanumeric information and setting various functions. The function keys may include arrow keys, side keys, and hot keys that are set to execute specific functions. When various input signals are input, for example, an external device such as a communication device is connected to the interface unit 140 according to a user's demand, the input unit 110 may generate an input signal corresponding to the reading of data that is stored in the communication device and transmit the input signal to the control unit 160. Particularly, the input unit 110 may generate an input signal for reproducing content 151 stored in the memory unit 150, a reproducing control signal of the content 151 such as volume up/down signals, and an input signal for selecting the vibration pattern 153. The generated input signal is transmitted to the control unit 160 and serves as a command for execution of a required function.

The audio processor 120 may reproduce an audio signal transmitted from the control unit 160 such that the audio signal may be reproduced through a speaker SPK during the reproduction of the content 151. When the mobile terminal 100 has a mobile communication function, the audio processor 120 may include a microphone MIC for collecting user voice and other audio signal during the communication. That is, the audio processor 120 converts voice/sound data into an audible sound through the speaker SPK under the control of the control unit 160 and digitalizes an audio signal such as voice received from the microphone MIC to transmit the digitalized data to the control unit 160. The audio processor 120 may vary amplitude of an audio signal to be output according to the volume up/down signals adjusted based on an input signal of the input unit 110. The audio processor 120 may adjust the magnitude of an audio signal to be output according to the vibration pattern 153 or another vibration pattern that is linked to a specific content 151. That is, the audio processor 120 may perform a fine adjustment of the volume up/down under the control of the control unit 160 when the amplitude of the vibration pattern 153 is large or frequency of the vibration pattern 153 varies.

The vibration operator 130 may include at least one vibrator and may be vibrated at a preset vibration pattern under the control of the control unit 160. The vibration operator 130 may realize vibrations according to vibration pattern including frequency bands corresponding to bass sound, high bass sound, midrange sound, low soprano sound, and soprano sound. The bass sound has a frequency band of 20 Hz to 150 Hz, the high bass sound has a frequency band of 150 Hz to 500 Hz, the midrange sound has a frequency band of 500 Hz to 2 kHz, the low soprano sound has a frequency band of 2 kHz to 8 kHz, and the soprano sound has a frequency band of 8 kHz to 20 kHz. The vibration operator 130 may include a plurality of vibrators to realize vibration according to the frequency bands of predetermined patterns corresponding to the bass sound, high bass sound, midrange sound, low soprano sound, and soprano sound. The vibration operator 130 is synchronized with an audio signal output from the audio processor 120 to realize the vibration according to the vibration pattern 153. By doing so, when volume of the audio signal decreases or increases, the vibration operator 130 may increase or decrease magnitude, that is, the amplitude of vibration according to the change of volume. When volume of the audio signal is changed, the vibration operator 130 may realize the vibration according to a new vibration pattern 153 under the control of the control unit 160.

The interface unit 140 provides a channel through which the mobile terminal 100 may communicate with another terminal or a memory chip. When the mobile terminal 100 supports wireless communication, the interface unit 140 may include an RF unit. When the mobile terminal 100 supports a serial communication, the interface unit 140 may be a USB interface or a UART interface. The interface unit 140 may form a communication channel with another terminal, a memory chip, a mobile communication system, or Internet and may receive content 151 through the communication channel. The interface unit 140 may include a broadcast module. In this case, the interface unit 140 may receive a broadcasting program from a broadcasting network and transmit the same to the control unit 160.

The memory unit 150 stores applications required to operating the mobile terminal 100, the content 151 transmitted from an external device such as another mobile terminal or a server, and the vibration pattern 153 synchronized with a reproduction of the content 151. The memory unit 150 may include a program region and a data region.

The program region stores an operating system (OS) for booting the mobile terminal 100 and applications such as a web browser for supporting a phone calling function, a file reproducing function, a menu selecting function, a file searching function of searching for photos, a broadcasting watching function, a message creating function, a web surfing function, etc. The program region may store a vibration pattern design algorithm.

The vibration pattern design algorithm designs pattern of vibration to be realized by the vibration operator 130 during the reproduction of the stored content 151. The vibration pattern design algorithm includes routines such that the vibration pattern 153 may be differently realized according to at least one of properties, included in the content 151, for example, genre such as rock, classical, pop, Korean pop, rap, etc., and audio property of the content 151. In other words, the vibration pattern design algorithm may include a routine of detecting frequency property and amplitude property of the content from the audio property, a routine of determining how the properties are changed during the reproduction of the content, and a routine of designing magnitude and length of the vibration to be realized by the vibration operator 130 and of generating the vibration pattern 153. The vibration pattern design algorithm may include a routine of separating various audio sources included in the audio signal according to frequency bands, a routine of generating sub-vibration patterns corresponding to the separated audio sources, and a routine of generating a single vibration pattern 153 by combining the sub-vibration patterns. The vibration pattern design algorithm may include a routine of controlling frequency property and amplitude property of the vibration pattern in which the sub-vibration patterns are combined according to genres of the content such as ballad, hip hop, jazz, etc. In addition, the vibration pattern design algorithm may include a routine of extracting frequency property and amplitude property from at least some part of the audio signal, a routine of determining genre property of the content based on the extracted frequency and amplitude properties, and a routine of generating the vibration pattern 153 by adding preset property adjustment in basis of the determined genre property.

In more detail, the vibration pattern design algorithm may include a routing of generating a pattern having a preset amplitude and a length that are gradually decreased and increased so as to provide a feeling of power and depth of bass sound when bass sound includes in the audio signal is reproduced and a routine of generating a pattern having an amplitude and length that increase and decrease within a preset range so as to provide richer and warmer feeling when high bass sound is reproduced. In a case of reproducing a midrange sound, the vibration pattern design algorithm may include a routine of designing a vibration pattern having a preset amplitude and vibrating in a certain length, and rapidly ceased so as to provide enhanced feeling. Moreover, the vibration pattern design algorithm may include a routine of designing a vibration pattern vibration patterns corresponding to a low soprano sound and a soprano sound.

To sum up, the vibration pattern design algorithm may include a routine of designing a vibration pattern of a specific sound based on an amplitude, time taking to increase or decrease to a preset amplitude, and time period when the preset amplitude is maintained using analyzed results of at least some part of the audio signal, and a routine of generating a vibration pattern corresponding to the audio signal based on the vibration pattern of the specific sound. Although the vibration pattern design algorithm has been described as to separate the frequency bands into bass sound, high bass sound, midrange sound, low soprano sound, and soprano sound, the frequency bands may be separated into more narrow frequency bands.

As described above, the vibration pattern design algorithm may include a routine of generating various vibration patterns to be applied to the reproduction of a content using the frequency property and the amplitude property of the audio signal. The vibration pattern design algorithm is not limited to the above-mentioned routines but may include routines of generating more various vibration patterns.

The data region is a region to which data generated when the mobile terminal is used are stored and stores user data related to various optional functions, such as a captured image or a moving picture shot by a camera, in a case where the mobile terminal has the camera, phone book data, audio data, and information corresponding to another user data. The data region may store a plurality of contents 151 transmitted from a memory, an external device, or another terminal through the interface unit 140. The plurality of contents 151 may be a plurality of images, a plurality of texts, a plurality of file information, and etc. The data region stores the vibration pattern 153. The vibration pattern 153 includes a vibrator adjusting parameter of operating the vibration operator 130 in a specific pattern and may include a plurality of vibration patterns as default. The vibration pattern 153 stored in the data region is linked with the content 151 stored in the memory unit 150 and is activated and transmitted to the vibration operator 130 when the content 151 is reproduced. When a new content 151 is stored or a content 151 to which the vibration pattern 153 is not linked is reproduced, the vibration pattern 153 may be generated and stored by the vibration pattern design algorithm. The vibration pattern 153 will be described in detail with the accompanying drawings later.

The display unit 170 outputs a screen activated according to functions of the mobile terminal 100. For example, the display unit 170 may output a booting screen, a standby screen, a menu screen, and a dialing screen. The display unit 170 may be a liquid crystal display (LCD). In this case, the display unit 170 may include an LCD controller, a memory storing data, and an LCD display device. When the LCD is implemented into a touch screen, a screen of the display unit 170 may serve as an input unit. The display unit 170 may output a media player screen for the reproduction of the content 151 and a screen corresponding to video data contained in the content 151 and reproduced with the content 151. The display unit 170 provides a screen outputting a playlist of the content 151 stored in the memory unit 150, a screen describing the vibration pattern linked with the content 151 in brief, and a screen setting a vibration pattern to be linked with the content 151. When the vibration pattern 153 is generated by the vibration pattern design algorithm during the reproduction of content 151, the display unit 170 may output a popup window checking whether the generate vibration pattern 153 is stored after the reproduction of content 151. When the vibration pattern 153 is set to the content 151, the display unit 170 may display icons and/or images indicating the vibration pattern 153 according to each item of the content playlist.

Figure 2:
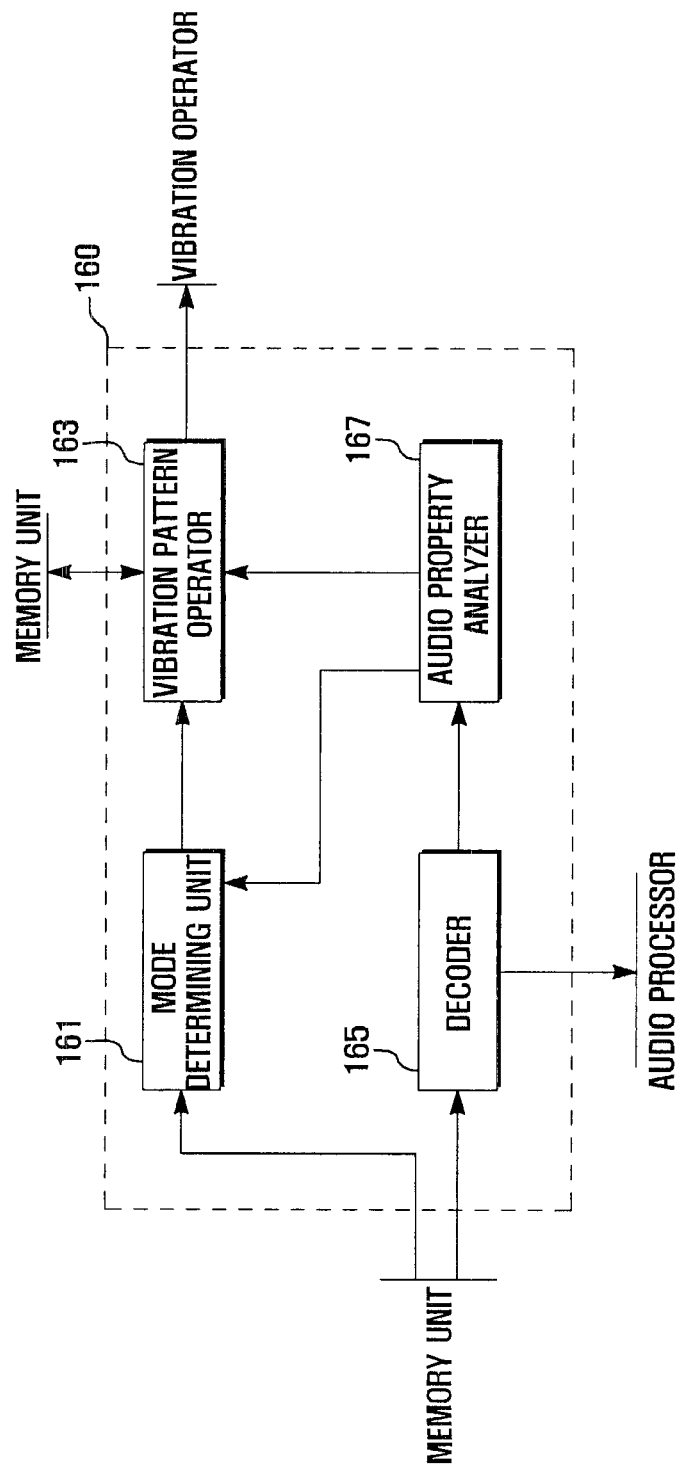
FIG. 2 is a detail view illustrating a control unit of FIG. 1.

The control unit 160 controls the supply of electric power of the mobile terminal 100, activation of respective devices thereof, and signal transmission between the devices. The control unit 160 may manage the operation of the vibration pattern 153 for the reproduction of a specific content according to the setting and a user request for the vibration pattern of the content or the link of the vibration pattern with the content 151. The control unit 160 may control the generation of the vibration pattern 153 of a specific content 151. To this end, the control unit 160, as illustrated in FIG. 2, may include a mode determining unit 161, a vibration pattern operator 163, a decoder 165, and an audio property analyzer 167.

The mode determining unit 161 receives an analysis result from the audio property analyzer 167 for analyzing audio property of decoded data during the reproduction of the stored content 151 and determines a mode of a currently reproduced content 151. In other words, the mode determining unit 161 may determine musical genre or sound field effect of the content (by reading) from the audio property of at least some part of the reproducing content. That is, the mode determining unit 161 may determine whether the musical genre of the content is "Jazz," "Rock," "Hip Hop," or other genre and whether sensitive audio property indicating timbre is "spectacular" or "sharp." To this end, the mode determining unit 161 may include a vibration pattern serving as a predetermined reference of classifying the audio property of the content. The mode determining unit 161 compares the predetermined reference vibration pattern with a vibration pattern obtained by the audio property analysis to determine the reproduction mode of the content 151 and to transmit the determined reproduction mode to the vibration operator 163. The mode determining unit 161 may check the musical genre written in header information of the content 151, determine the reproduction mode according to the musical genre, and transmit the determined reproduction mode to the vibration pattern operator 163.

The vibration pattern operator 163 may check whether a vibration pattern is linked with the content during the reproduction of the content, read the linked vibration pattern from the memory unit 150 when the vibration pattern is linked, and control the vibration operator 130 according to the linked vibration pattern. When the vibration pattern is not linked with the content, the vibration pattern operator 163 may select the vibration pattern 153 stored in the memory unit 150 according to a mode transmitted from the mode determining unit 161, and control the vibration operator 130 according to the selected vibration pattern 153. In other words, when the vibration pattern 153 is not linked with the content 151, the vibration pattern operator 163 utilizes the vibration pattern design algorithm to generate a new vibration pattern 153 based on the reproduction mode transmitted from the mode determining unit 161. That is, the vibration pattern operator 163 generates the vibration pattern 153 operating the vibration operator 130 on the basis of the vibration pattern in the reproduction mode. After that, the vibration pattern operator 163 may control the vibration pattern 153 to be synchronized with the reproduction of the content. When the vibration pattern 153 is generated based on the reference vibration pattern, the vibration pattern operator 163 may adjust the amplitude and duration of vibration by applying a current property of an audio signal transmitted from the audio property analyzer 167. The vibration pattern operator 163 may vary the vibration pattern 153 according to an input signal from the input unit 110. That is, when a user wants to set effects of the content through the input unit 110 in order to listen to the contents 151 spectacular or speedy, the vibration pattern operator 163 may add the effects using the vibration pattern design algorithm. To this end, the control unit 160 may output a pattern selection window as a menu option such that a specific effect may be added to the vibration pattern 153 as described above. Items displayed on the pattern selection window may include items for sound color such as "spectacular", "heavy", and the like and for musical genres such as "Jazz", "Rock", "Hip Hop", and the like. The items are values in which amplitude, frequency, and vibration duration are substantially set and these values are applied to the vibration pattern selectively so that the above-mentioned sensitive effect may be exhibited.

The decoder 165 decodes corresponding data and provides the decoded corresponding data to the audio processor 120 during the reproduction of the content 151 stored in the memory unit 150. The decoder 165 may transmit the corresponding data decoded during the reproduction of the content 151 to the audio processor 120 and the audio property analyzer 167.

The audio property analyzer 167 analyzes the audio property based on the decoded data transmitted from the decoder 165. That is, the audio property analyzer 167 analyzes the amplitude and frequency of the audio signal of the audio data included in the content 151 and reproduced for a preset time period to determine which amplitude and frequency or which vibration pattern the audio data have. Substantially, the audio property analyzer 167 may analyze how much bass sound, high bass sound, midrange sound, low soprano sound, and soprano sound are distributed in the audio signal that is reproduced for the preset time period and which amplitude a corresponding sound has, and may transmit the analysis results to the mode determining unit 161 and the vibration pattern operator 163.

As such, the control unit 160 may determine the mode of the currently-reproduced content, check the vibration pattern 153 to operate the vibration operator 130 while the content is reproduced according to the determined mode, and synchronize the corresponding vibration pattern 153 with the content 151. In this case, the control unit 160 may determine the mode of the content 151 based on at least one of the musical genre obtained from the header of the content 151 and the audio property analyzed each time period of the content 151, generate a vibration pattern 153 corresponding to the content 151 based on the determined mode, and control the vibration operator 130 to operate during the reproduction of the content 151 using the vibration pattern 153. When the reproduction of the content 151 is finished, the control unit 160 may check whether the generated vibration pattern 153 is stored. When a specific vibration pattern 153 is linked with the content 151, the control unit 160 may read out the linked vibration pattern 153 from the memory unit 150 and synchronize the linked vibration pattern 153 with the reproducing content 153.

Figure 3:
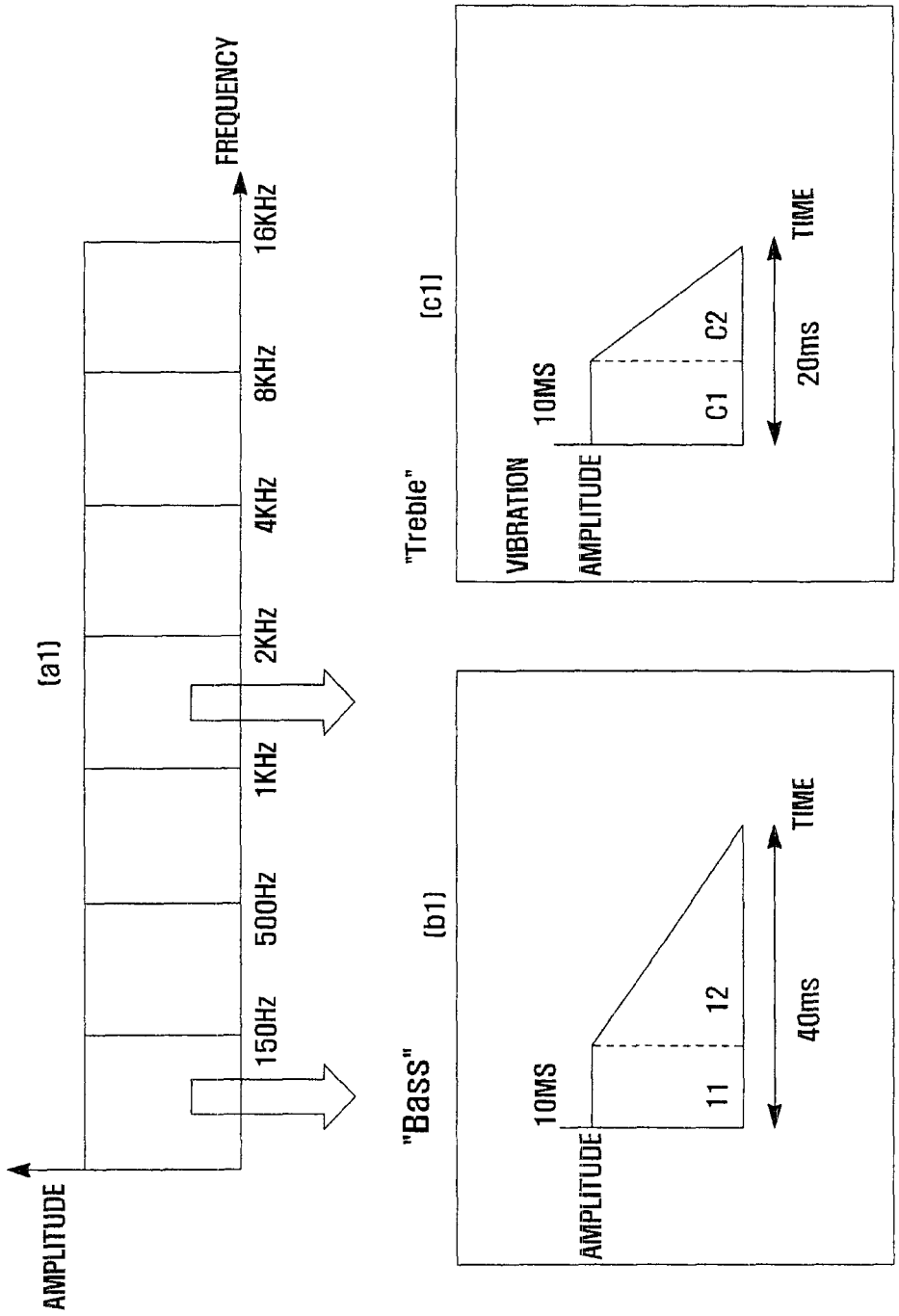
FIG. 3 is a view illustrating vibration patterns in a vibration pattern design algorithm according to an exemplary embodiment of the present invention.

FIG. 3 is a view illustrating vibration patterns in the vibration pattern design algorithm according to an exemplary embodiment of the present invention. For easy description, vibration patterns related to bass sound and midrange sound as exampled will be described.

Referring to FIG. 3, the vibration pattern design algorithm may separate frequencies by respective bands as shown in FIG. 3A1. The frequency band may be separated into a bass sound region up to 150 Hz and a midrange sound region in the neighborhood of 1 kHz. The vibration pattern design algorithm may convert the vibration pattern off the bass sound region into a vibration pattern of maintaining at a uniform level for 11 time and of decreasing the level for 12 time as shown in FIG. 3B1. In this case, the 11 time may be about 10 ms and total vibration time may be about 40 ms. The converted vibration pattern in the bass sound region maintains lingering of vibrations so that a user may feel woofer sound.

Meanwhile, the vibration pattern design algorithm may convert the vibration pattern of the midrange sound region into a vibration pattern of maintaining a uniform level for c1 time and of decreasing the level with a slope larger than that of the bass sound region for c2 time as shown in FIG. 3C1. In this case, the c1 time may be about 10 ms and total vibration time may be about 20 ms. The converted vibration pattern in the midrange sound region maintains lingering of vibrations for a short time so that a user may feel light and delicate. The above-mentioned times are arbitrary but may be increased or decreased by user manipulation or a designer.

Figure 4:
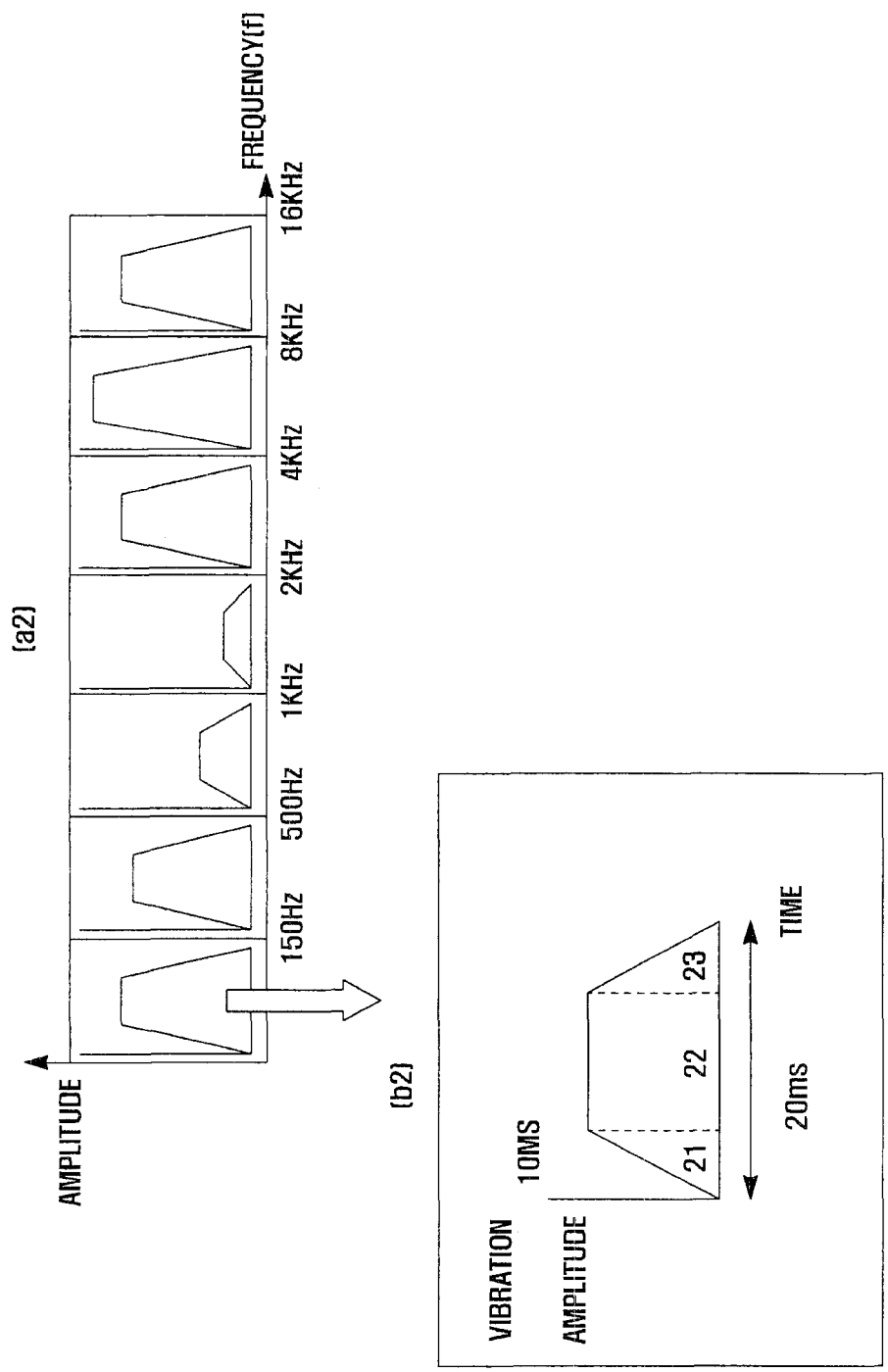
FIG. 4 is a view illustrating vibration patterns in a vibration pattern design algorithm according to another exemplary embodiment of the present invention.

FIG. 4 is a view illustrating vibration patterns in vibration pattern design algorithm according to another exemplary embodiment of the present invention.

Referring to FIG. 4, the vibration pattern, as illustrated in FIG. 4A2, has a large amplitude in a bass sound region and a relatively small amplitude in a midrange sound region. The vibration pattern may be a preset vibration pattern designed by the vibration pattern design algorithm or a vibration pattern generated by the vibration pattern operator based on audio property pattern that is analyzed by the audio property analyzer. The vibration pattern, as illustrated in FIG. 4B2, exhibits a line increasing to a preset amplitude at a preset slope for 21 time, a line with a slope "0" while the preset amplitude is maintained for 22 time, and a line having an amplitude decreasing at a preset slope for 23 time. In the vibration pattern, since the amplitude of the midrange sound region is relatively smaller than those of the bass sound region and the soprano sound region, a user may feel musical genre "Rock" is reproduced via vibration of the vibration operator 130 as providing predetermined vibration pattern according to a ROCK beat.

Figure 5:
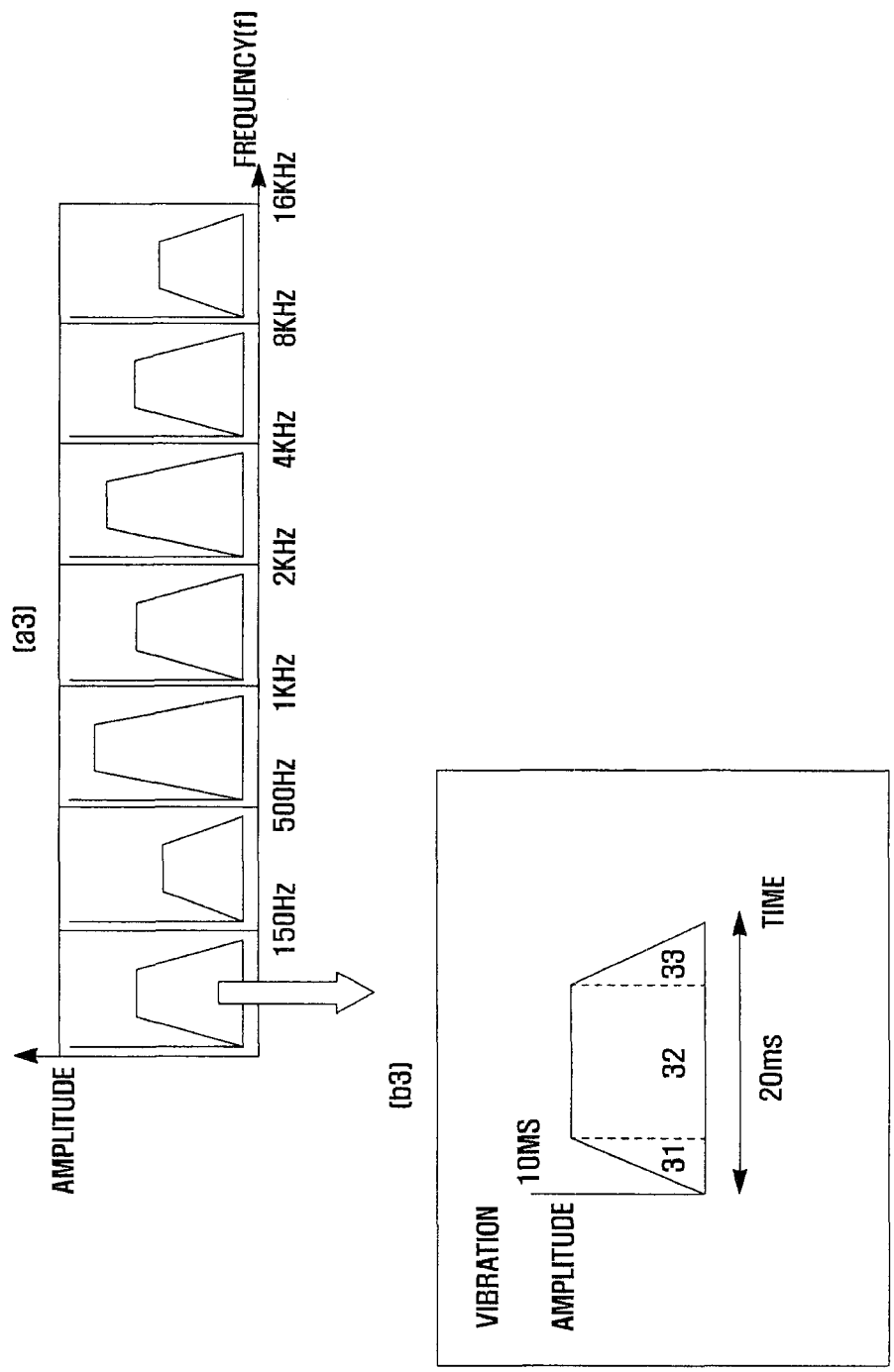
FIG. 5 is a view illustrating vibration patterns in a vibration pattern design algorithm according to still another exemplary embodiment of the present invention.

FIG. 5 is a view illustrating vibration patterns in vibration pattern design algorithm according to still another exemplary embodiment of the present invention.

Referring to FIG. 5, the vibration pattern, as illustrated in FIG. 5A3, amplitudes of bass sound region and midrange sound region are equal and sounds in boundary regions, such as high bass sound region and low soprano sound region, are relatively high or low. This vibration pattern may be a vibration pattern set by the vibration pattern design algorithm, or a vibration pattern generated by the vibration pattern operator based on the audio property pattern that is analyzed by the audio property analyzer. The vibration pattern, as illustrated in FIG. 5B3, exhibits a line increasing to a preset amplitude at a preset slope for 31 time, a line with a slope "0" while the preset amplitude is maintained for 32 time, and a line having an amplitude decreasing at a preset slope for 33 time. In the vibration pattern, since the amplitudes of the bass sound region and the amplitude of sound in the boundary region is relatively small or large, a user may feel musical genre "Jazz" is reproduced by vibration of the vibration operator 130.

As described above, the mobile terminal 100 according to the exemplary embodiment of the present invention generate vibration pattern by adjusting frequency and amplitude of a specific vibration pattern and synchronizes the generated vibration pattern with a audio data according to the reproduction of the content, so that a user can listen to tactile and sensitive audio sound during the reproduction of an audio file.

Hereinbefore, the mobile terminal according to the exemplary embodiment of the present invention has been described. Hereinafter, a vibrating method of a mobile terminal according to an exemplary embodiment of the present invention will be described in detail.

FIG. 6 is a flowchart illustrating a method of reproducing content in a mobile terminal according to an exemplary embodiment of the present invention.

Referring to FIG. 6, in the method of reproducing content of a mobile terminal according to an exemplary embodiment of the present invention, when an electric power is supplied to the mobile terminal, the control unit may perform a booting of the mobile terminal and control the mobile terminal to output a standby screen after the booting (101). When content stored in the memory unit is selected in the default mode of the mobile terminal or by a user demand, the control unit may activate an application program required to reproduce the content such as Media Player to prepare for the reproduction of the content (103). When the preparation for the reproduction of the content is completed, the control unit may check whether a vibration pattern matches a predetermined pattern (105). For this check, when a specific predetermined vibration pattern corresponds with the content, information on the specific predetermined vibration pattern may be stored. When none of predetermined vibration patterns is matched, the control unit controls the audio property analyzer to analyze the audio property (107). For the analysis, the control unit may decode data of the content to generate decoded data, detect the audio property, that is, at least one of amplitude and frequency from the decoded data, and analyze the audio property such as the specific vibration pattern based on the at least one of the detected amplitude and frequency, as explained with reference to FIGS. 3-5.

Thereafter, the control unit may determine a mode based on the detected audio property (109). For the determination, the control unit may read out pre-stored reference vibration patterns for the determination from the memory unit and determine whether the mode of a currently-reproduced content is "Rock," "Jazz," "Spectacular," or "Sharp" according to the reference vibration patterns.

The control unit may check whether one of pre-stored vibration patterns corresponds to the determined mode exists (111). When the corresponding pre-stored vibration pattern exists in the memory unit (111), the control unit may read out the vibration pattern stored in the memory unit and control the vibration operator to operate based on the vibration pattern (113). Thereafter, when the pre-stored vibration pattern matches with the currently-reproduced content is stored in the memory unit (105), the control unit may operate the vibration operator based on the linked vibration pattern during a reproduction of the content (113).

The control unit checks whether the reproduction of the content is finished (115). When the content is still reproduced, the control unit may operate the vibration operator based on the corresponding vibration pattern and control the audio processor to output the audio signal included in the content. In this case, when the content includes video data, the control unit may control the display unit to output a screen corresponding to the video data.

Meanwhile, when none of the vibration patterns corresponding to the mode exists in the memory unit (111), the control unit may design a vibration pattern corresponding to the mode (117). Specifically, the control unit may check a mode of the currently-reproduced content according to the mode of the content determined by the mode determining unit, that is, the musical genre or the audio property. In this case, the control unit generates the vibration pattern based on the determined mode. In other words, the control unit may generate a vibration pattern corresponding to a rock music mode when the mode of the currently-reproduced content is "Rock" or to a jazz music mode when the mode is "Jazz." When the mode of the content is "allegro" the control unit may generate a vibration pattern corresponding to that mode. When the above-mentioned vibration patterns are generated in advance, the control unit may select a specific vibration pattern corresponding to the mode determined by the mode determining unit and use the specific vibration pattern as a reference of operating the vibration operator during the reproduction of the content. The control unit may vary the vibration patterns by analyzing the audio property with the audio property analyzer during the reproduction of the content. In general, the content may have various color fields according to a singer, played musical instruments, and environment when audio information is collected even in same rock music mode. Thus, the control unit may control amplitude, length, and maintaining time of the vibration pattern generated based on the amplitude and frequency that are analyzed through the audio property analysis. Since a single content may have various musical modes, that is, rock mode and ballad mode may be mixed, the control unit may detect an audio signal of which time part corresponds to the specific mode using the audio property analyzer.

When the vibration pattern is designed according to the mode and the audio property (117), the control unit operates the vibration operator based on the designed vibration pattern (119). That is, the control unit may control the vibration operator to realizing vibration corresponding to the vibration pattern and to output the audio signal during the reproduction of the content. In this case, time of the reproduction of the content may be synchronized with time of the operation of the vibration operator. To this end, since the audio property analysis and the generation of the vibration pattern based on the analysis are carried out after the reproduction of the content and the control unit operates the vibration operator according to the vibration pattern, the control unit may buffer the reproduction time of the content as long as a preset time to generate the vibration pattern in advance and synchronize the reproduction of the content with the vibration using the buffered vibration pattern.

Next, the control unit checks whether the reproduction of the content is maintained (121). When the content is still reproduced, the control unit returns prior to step 119 and performs procedures from step 119. When the reproduction of the content is finished (121), the control unit may check whether the generated vibration pattern is to be stored (123). When the generated vibration pattern is not to be stored, the control unit finishes the reproduction of the content without storing.

Meanwhile, when the storing is selected (123), the control unit may link the generated vibration pattern with the content to be stored (125). In this case, the control unit may record new header information on the generated vibration pattern or manage playlist of the contents with which the vibration pattern is linked to indicate that the generated vibration pattern is linked with the corresponding content. The control unit may store the generated vibration pattern in the form of mode, that is, vibration pattern classified by musical genre.

As described above, in the method of reproducing content in a mobile terminal according to the exemplary embodiment of the present invention, whether a vibration pattern is linked with reproduced content is checked and the corresponding vibration pattern is synchronized with a reproduced audio signal so that tactile and sensitive sound may be provided. When none of vibration pattern is linked with a specific content, the audio property of the content is analyzed to determine musical genre and audio property of the content, a specific vibration pattern is generated based on the musical genre or the audio property, and the vibration operator is operated using the generated vibration pattern. By doing so, since vibration patterns are generated and used with respect to each content, uniform vibration may be excluded. Therefore, individual and suitable vibration operation is enabled so that reproduction of an audio source may be reinforced during the reproduction of content.

The exemplary embodiments of the present invention are provided for the easy description and understanding of the present invention with specific examples but do not limit the scope of the present invention. It will be appreciated by those skilled in the art that various changes and modifications may be practiced without departing from the spirit of the present invention.

What is claimed is:

1. A method of reproducing content of a mobile terminal, the method comprising:
   receiving a request of a reproduction of the content including audio data;
   analyzing an audio property including at least one of an amplitude and a frequency of the audio data to detect a distribution of sounds in the audio data;
   determining at least one of a musical genre and timbre that corresponds to the distribution of sounds in the audio data;
   generating a vibration pattern based on the at least one of the musical genre and timbre; and
   vibrating the mobile terminal according to the generated vibration pattern.

2. The method of claim 1, wherein the generation of the vibration pattern comprises:
   separating frequency bands;
   generating a pattern in which a vibration occurs based on at least one of a region where a uniform amplitude is maintained, a region where the amplitude increases to a preset amplitude, and a region where the amplitude decreases from the preset amplitude through the separated frequency bands; and
   applying the generated pattern to the at least one of the frequency and the amplitude obtained from the analyzed audio property to generate the vibration pattern of the content.

3. The method of claim 1, wherein the generation of the vibration pattern comprises:
   selecting a pre-stored vibration pattern corresponding to the at least one of the musical genre and timbre; and
   determining the vibration pattern by comparing the selected vibration pattern to the analyzed audio pattern.

4. The method of claim 1, further comprising:
   checking whether the reproduction of the content is completed;
   storing the generated vibration pattern when the reproduction of the content is completed; and
   linking the stored vibration pattern with the content.

5. The method of claim 1, wherein vibrating the mobile terminal comprises at least one of:
   vibrating the mobile terminal based on a pattern of vibration corresponding to the amplitude and the frequency of audio data included in the content; and
   increasing or decreasing the amplitude of the vibration when volume of the audio data to be reproduced is increased or decreased.

6. The method of claim 1, further comprising:
   selecting a specific mode based on an input signal received from an input unit; and
   adjusting at least one of the amplitude and the frequency of the generated vibration pattern according to at least one of the musical genre and timbre associated with the selected mode.

7. A method of reproducing content in a mobile terminal, comprising:
   receiving a request of a reproduction of the content including audio data;
   determining whether at least one of a musical genre and a timbre exists which matches a distribution of sounds in the audio data of the content;
   generating a vibration pattern of the mobile terminal based on the at least one of the musical genre and the timbre; and
   synchronizing the distribution of sounds in the audio data of the content with the generated vibration pattern when the matching at least one of the musical genre and the timbre exists.

8. The method of claim 7, further comprising:
   separating frequency bands;
   wherein the vibration pattern includes a pattern in which vibration occurs based on at least one of a region where a uniform amplitude is maintained, a region where the amplitude increases to a preset amplitude, and a region where the amplitude decreases from the preset amplitude through the separated frequency bands.

9. The method of claim 8, wherein the synchronization step comprises at least one of:
   vibrating the mobile terminal with respect to amplitudes and frequencies of signals included in the audio data of the content based on the determined vibration pattern;
   selectively increasing or decreasing the volume of the audio data to be reproduced;
   selectively increasing or decreasing amplitudes of the vibration when the volume is increased or decreased; and
   selectively increasing or decreasing the volume of the audio data based on a change of an amplitude of the determined vibration pattern.

10. The method of claim 7, further comprising displaying a playlist of contents including the audio data;
    wherein, in the display of the playlist, a content with which the determined vibration pattern is linked is displayed to be distinguished from other contents.

11. A content reproducing apparatus of a mobile terminal, comprising:
    a storage unit storing content including audio data;
    an input unit generating an input signal for reproducing the stored content;
    a determining unit determining at least one of a musical genre and a timbre corresponding to a distribution of sounds in the audio data;
    a control unit checking whether a vibration pattern corresponding to the distribution of sounds in the audio data of the content is stored, if no corresponding vibration pattern is stored, generating the vibration pattern based on the at least one of the musical genre and the timbre, and synchronizing the vibration pattern with the distribution of sounds during a replay of the content; and
    a vibration operator generating a vibration to the mobile terminal according to the vibration pattern.

12. The content reproducing apparatus of claim 11, wherein the control unit comprises:
- an audio property pattern analyzer analyzing audio property including at least one of an amplitude and a frequency in the audio data and detecting a distribution of sounds in the audio data; and
- a vibration pattern operator generating the vibration pattern based on the determined at least one of the musical genre and the timbre of the content corresponding to the distribution of sounds in the audio data and realizing the vibration according to the vibration pattern.

13. The content reproducing apparatus of claim 12, wherein the storage unit stores a vibration pattern design algorithm for the generation of the vibration pattern.

14. The content reproducing apparatus of claim 13, wherein the vibration pattern design algorithm comprises:
- a routine of separating frequency bands;
- a routine of generating a pattern vibrated according to at least one of a region where a uniform amplitude is maintained in the separated frequency bands, a region where the amplitude increases to the uniform amplitude, and a region where the amplitude decreases from the uniform amplitude; and
- a routine of generating the vibration pattern of the content by applying the pattern to the frequency and the amplitude that are obtained from the analyzed audio property.

15. The content reproducing apparatus of claim 13, wherein the vibration pattern operator selects a pre-stored vibration pattern based on the determined at least one of the musical color and the timbre and adjusting the vibration pattern by applying the analyzed audio pattern to the vibration pattern.

16. The content reproducing apparatus of claim 13, further comprising a display unit outputting a popup window to check whether the generated vibration pattern is stored when the reproduction of the content is completed.

17. The content reproducing apparatus of claim 16, wherein the control unit stores the vibration pattern by linking the vibration pattern with the determined content.

18. The content reproducing apparatus of claim 13, wherein, when a specific mode is selected according to the input signal from the input unit, the vibration pattern operator adjusts at least one of the amplitude and the frequency of the vibration pattern based on the selected mode.

19. The content reproducing apparatus of claim 11, further comprising an audio processor processing an output of the audio data;
- wherein the control unit selectively increases or decreases the amplitude of the vibration corresponding to volume up or down changes when volume of the audio data to be reproduced is increased or decreased.

20. The content reproducing apparatus of claim 11, further comprising a display unit displaying a playlist of contents including the audio data.

* * * * *